United States Patent
Tai (10) Patent No.: US 10,281,622 B2
(45) Date of Patent: *May 7, 2019

(54) MULTILAYER POLYMERIC REFLECTOR

(71) Applicant: 3M INNOVATIVE PROPERTIES COMPANY, St. Paul, MN (US)

(72) Inventor: Huiwen Tai, Lake Elmo, MN (US)

(73) Assignee: 3M INNOVATIVE PROPERTIES COMPANY, Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/666,650

(22) Filed: Aug. 2, 2017

(65) Prior Publication Data

US 2017/0351011 A1 Dec. 7, 2017

Related U.S. Application Data

(63) Continuation of application No. 15/031,821, filed as application No. PCT/US2014/066220 on Nov. 18, 2014, now Pat. No. 9,739,912.

(Continued)

(51) Int. Cl.
*G02B 5/08* (2006.01)
*G02B 5/30* (2006.01)
(Continued)

(52) U.S. Cl.
CPC ............ *G02B 5/0841* (2013.01); *B32B 27/08* (2013.01); *G02B 5/305* (2013.01); *G02B 5/3083* (2013.01);
(Continued)

(58) Field of Classification Search
CPC .... G02B 5/0841; G02B 19/0042; B32B 27/08
(Continued)

(56) References Cited

U.S. PATENT DOCUMENTS 5,122,905 A 6/1992 Wheatley et al.
5,278,694 A 1/1994 Wheatley et al.
(Continued)

FOREIGN PATENT DOCUMENTS

CN 102561726 7/2012
CN 103015653 4/2013
(Continued)

OTHER PUBLICATIONS

International Search Report for PCT International Application No. PCT/US2014/066220 dated Jan. 28, 2015, 3 pages.

*Primary Examiner* — Ricky D Shafer
(74) *Attorney, Agent, or Firm* — Daniel J. Iden (57) ABSTRACT

A multilayer polymeric reflector is provided which comprises: a) a plurality of first optical layers, each first optical layer comprising a polyester having terephthalate comonomer units and ethylene glycol comonomer units, the polyester having a glass transition temperature, where each first optical layer is oriented, and b) a plurality of second optical layers disposed in a repeating sequence with the plurality of first optical layers, each second optical layer comprising a blend of polymethyl methacrylate (PMMA) and polyvinylidene fluoride (PVDF), where the blend has a glass transition temperature less than the glass transition temperature of the polyester comprising the first optical layers, and where the amount of PVDF in the PMMA/PVDF blend is greater than and not equal to about 40% and not more than about 65%. Articles comprising the multilayer polymeric reflector are also provided.

18 Claims, 5 Drawing Sheets

Related U.S. Application Data (60) Provisional application No. 61/906,160, filed on Nov. 19, 2013.

(51) Int. Cl.
  *G02B 19/00* (2006.01)
  *B32B 27/08* (2006.01)

(52) U.S. Cl.
  CPC ..... *G02B 19/0019* (2013.01); *G02B 19/0042* (2013.01); *B32B 2250/05* (2013.01); *B32B 2250/24* (2013.01); *B32B 2250/42* (2013.01); *B32B 2307/416* (2013.01)

(58) Field of Classification Search
  USPC ........................................ 359/584, 838, 883
  See application file for complete search history.

(56) References Cited

U.S. PATENT DOCUMENTS

| | | | |
|---|---|---|---|
| 5,339,198 A | 8/1994 | Wheatly | |
| 5,340,909 A | 8/1994 | Doerr | |
| 5,353,154 A | 10/1994 | Lutz et al. | |
| 5,360,659 A | 11/1994 | Arends | |
| 5,552,927 A | 9/1996 | Wheatly | |
| 5,673,148 A | 9/1997 | Morris et al. | |
| 5,882,774 A | 3/1999 | Jonza | |
| 6,268,961 B1 | 7/2001 | Nevitt | |
| 6,888,677 B2 | 5/2005 | Condo et al. | |
| 7,141,297 B2 | 11/2006 | Condo | |
| 7,303,292 B2 | 12/2007 | Yukawa et al. | |
| 8,147,075 B2 | 4/2012 | Mimura et al. | |
| 8,522,489 B2 | 9/2013 | Bear | |
| 9,739,912 B2 * | 8/2017 | Tai | G02B 5/0841 |
| 2002/0039235 A1 * | 4/2002 | Condo | B29C 55/023 359/589 |
| 2004/0233526 A1 | 11/2004 | Kaminsky et al. | |
| 2004/0241469 A1 | 12/2004 | McMan | |
| 2005/0186408 A1 | 8/2005 | Condo | |
| 2011/0045260 A1 | 2/2011 | Lee | |
| 2011/0240064 A1 | 10/2011 | Wales | |

FOREIGN PATENT DOCUMENTS

| | | |
|---|---|---|
| DE | 102010033031 | 2/2012 |
| EP | 2653775 | 10/2013 |
| JP | H03-139603 A | 6/1991 |
| JP | H05-309940 A | 11/1993 |
| JP | 2003-035799 A | 2/2003 |
| JP | 2011-226184 | 11/2011 |
| WO | WO 1995-17691 | 6/1995 |
| WO | WO 1997-01440 | 1/1997 |
| WO | WO 1997-01774 | 1/1997 |
| WO | WO 1997-01778 | 1/1997 |
| WO | WO 1999-06203 | 2/1999 |
| WO | WO 1999-36248 | 7/1999 |
| WO | WO 1999-36257 | 7/1999 |
| WO | WO 1999-36258 | 7/1999 |
| WO | WO 1999-36262 | 7/1999 |
| WO | WO 1999-36808 | 7/1999 |
| WO | WO 1999-36809 | 7/1999 |
| WO | WO 1999-36812 | 7/1999 |
| WO | WO 1999-36813 | 7/1999 |
| WO | WO 1999-36814 | 7/1999 |
| WO | WO 2012-154793 | 11/2012 |
| WO | WO 2013-095120 | 6/2013 |
| WO | WO 2013-133978 | 9/2013 |

* cited by examiner

MULTILAYER POLYMERIC REFLECTOR

FIELD OF THE DISCLOSURE

This disclosure relates to multilayer polymeric reflectors which are particularly useful in connection with high intensity light sources due to their durability and resistance to yellowing.

BACKGROUND OF THE DISCLOSURE

U.S. Pat. No. 7,141,297 discloses a multilayer polymeric mirror comprising oriented layers of PET alternating with layers of a PMMA/PVDF blend that has a Tg lower than the PET. That reference teaches:

"The amount of PVDF used in the blends is typically not more than about 40% by weight (i.e. a 60/40 PMMA/PVDF blend). With higher levels of PVDF, the miscibility of the PMMA and PVDF tends to deteriorate, thereby causing losses in clarity. In general, it is desirable to use PVDF in the blends in an amount as high as possible in order to increase the benefit in reductions in refractive index and glass transition temperature. However, smaller amounts can be used when it is desired to fine tune the composition to provide particular optical or physical properties for certain applications. For example, a 75/25 blend provides highly desirable physical and optical properties for use with high refractive index materials such as PEN, PET and mixtures or copolymers thereof" (U.S. Pat. No. 7,141,297 at col. 14, lines 42-55).

"As described above, the blending of polyvinylidene fluoride (PVDF) with PMMA reduces the glass transition temperature of the blended polymers. Preferably, the blend includes about 20 to 40 wt. % PVDF and 60 to 80 wt. % PMMA. Below about 20 wt. % PVDF, the glass transition temperature is above that of PET, although these blends are still acceptable for some applications. Above about 40 wt. %, PVDF crystallizes. The addition of PVDF to the second optical layers can also enhance other properties, such as, for example, solvent resistance." (U.S. Pat. No. 7,141,297 at col. 14, line 65—col. 15, line 7.)

SUMMARY OF THE DISCLOSURE

Briefly, the present disclosure provides a multilayer polymeric reflector comprising: a) a plurality of first optical layers, each first optical layer comprising a polyester having terephthalate comonomer units and ethylene glycol comonomer units, the polyester having a glass transition temperature, where each first optical layer is oriented, and b) a plurality of second optical layers disposed in a repeating sequence with the plurality of first optical layers, each second optical layer comprising a blend of polymethyl methacrylate (PMMA) and polyvinylidene fluoride (PVDF), where the blend has a glass transition temperature less than the glass transition temperature of the polyester comprising the first optical layers, and where the amount of PVDF in the PMMA/PVDF blend is greater than and not equal to about 40% and not more than about 65%. The multilayer polymeric reflector has a reflectivity of greater than 97.8% in a visible wavelength region and a transmission haze value of less than 50% in a visible wavelength region. In some embodiments, the amount of PVDF in the PMMA/PVDF blend is greater than 45%, and in some embodiments the amount of PVDF in the PMMA/PVDF blend is greater than or equal to about 50%. In some embodiments, the amount of PVDF in the PMMA/PVDF blend is about 50%. In some embodiments, the multilayer polymeric reflector has a reflectivity of greater than 98.0%, in some embodiments, greater than 98.2%. In some embodiments, the total number of first and second layers is no more than 700, in some embodiments, no more than 650. In some embodiments, the multilayer polymeric reflector resists shrinkage in use, to the extent that it demonstrates shrinkage of less than 1.5% in the total of width plus length following an exposure of 15 minutes to a temperature of 120 degrees centigrade; in some embodiments, the multilayer polymeric reflector demonstrates shrinkage of less than 1.0%, in some less than 0.5%, and in some less than 0.2%. In some embodiments, the multilayer polymeric reflector has a transmission haze value of less than 46% in a visible wavelength region, in some less than 42%, in some less than 30%, in some less than 20%, and in some less than 10%. In some embodiments, the first and second optical layers are coextruded. In some embodiments, the first optical layers are biaxially oriented. In some embodiments, the multilayer polymeric reflector is annealed at an annealing temperature of between 70 and 95 degrees centigrade for at least 30 seconds. In some embodiments, the multilayer polymeric reflector is annealed at an annealing temperature of between 80 and 95 degrees centigrade for at least 30 seconds. In some embodiments, the multilayer polymeric reflector is annealed at an annealing temperature of between 80 and 95 degrees centigrade for at least 35 seconds. In some embodiments, the multilayer polymeric reflector is annealed at an annealing temperature of between 70 and 95 degrees centigrade for at least two minutes. In some embodiments, the multilayer polymeric reflector is annealed at an annealing temperature of between 70 and 95 degrees centigrade for at least one hour. In some embodiments, the multilayer polymeric reflector additionally comprises an optically clear UV-rejecting acrylic coating layer. In some embodiments, the multilayer polymeric reflector additionally comprises an adhesive layer. In some embodiments, the multilayer polymeric reflector is specular or semi-specular at visible wavelengths. In some embodiments, the multilayer polymeric reflector is at least 50% specular at visible wavelengths. In some embodiments, the multilayer polymeric reflector is installed for outdoor use; in some embodiments it is directly exposed to ambient outdoor light, and in some embodiments it is directly exposed to ambient outdoor light and ambient outdoor air.

In another aspect, the present disclosure provides an article comprising: a) a light source; and b) the multilayer polymeric reflector according to the present disclosure. In some embodiments, the light source is an LED. In some embodiments, the article is a luminaire. In some embodiments, the article is a light bulb.

In another aspect, the present disclosure provides an article comprising the multilayer polymeric reflector according to the present disclosure situated so as to receive and reflect sunlight; in some embodiment direct sunlight, and in some embodiments concentrated sunlight.

In some embodiments, an article according to the present disclosure is designed for outdoor use. In some embodiments, the article is installed for outdoor use. In some embodiments, the multilayer polymeric reflector of the article is directly exposed to ambient outdoor light. In some embodiments, the multilayer polymeric reflector of the article is directly exposed to ambient outdoor light and ambient outdoor air.

DETAILED DESCRIPTION

The present disclosure provides a multilayer polymeric reflector comprising: a) a plurality of first optical layers, each first optical layer comprising a polyester having terephthalate comonomer units and ethylene glycol comonomer units, said polyester having a glass transition temperature, wherein each first optical layer is oriented, and b) a plurality of second optical layers disposed in a repeating sequence with the plurality of first optical layers, each second optical layer comprising a blend of polymethyl methacrylate (PMMA) and polyvinylidene fluoride (PVDF), wherein said blend has a glass transition temperature less than the glass transition temperature of the polyester comprising the first optical layers, and wherein the amount of PVDF in the PMMA/PVDF blend is greater than and not equal to about 40% and not more than about 65%; wherein the multilayer polymeric reflector has a reflectivity of greater than 97.8% in a visible wavelength region and a transmission haze value of less than 50% in a visible wavelength region. The present disclosure also provides articles that include such reflectors, in particular articles wherein the reflector is positioned in close proximity to a light source, articles wherein the reflector is used to receive and reflect sunlight, or articles used outdoors with exposure to sunlight.

Figure 7:
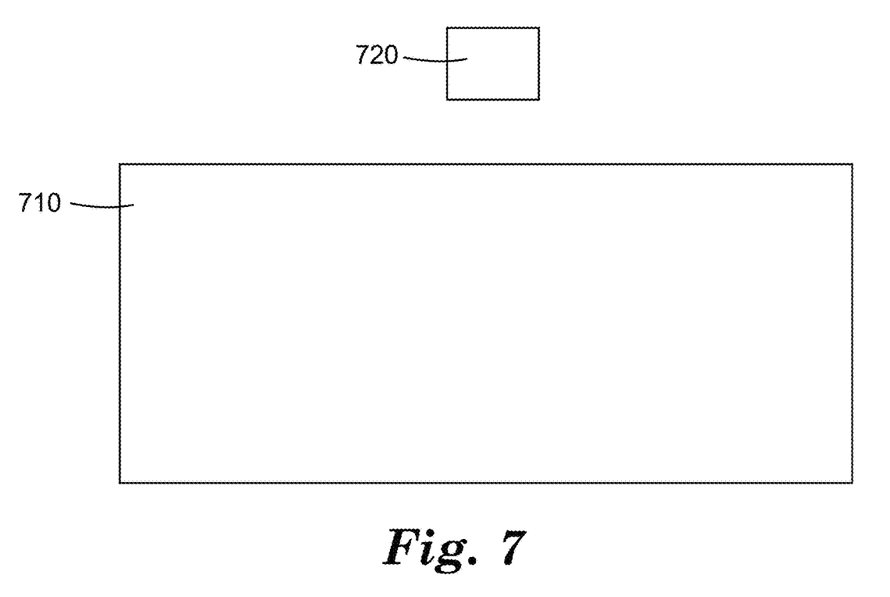
FIG. 7 is a schematic cross-sectional diagram of a reflector positioned in close proximity to a light source.

FIG. 7 illustrates a reflector 710 in close proximity to a light source 720.

The present disclosure concerns a multilayer polymeric reflector comprising oriented layers of PET alternating with layers of a PMMA/PVDF blend, where the PMMA/PVDF ratio is less than 60/40 and most typically 50/50. The present reflector achieves a reflectivity of 97.8% or greater. Without wishing to be bound by theory, the authors believe that the present reflector achieves this result without the loss of clarity predicted in the prior art due to the use of an annealing step during manufacture. In many embodiments, the reflector of the present disclosure also demonstrates superior resistance to yellowing. In some embodiments, the mirror may be subjected to additional heat treatment after annealing to reduce the potential for shrinkage in use, but without introducing unacceptable levels of haze. Finally, in some embodiments the addition of an optically clear UV-rejecting acrylic coating further increases resistance to yellowing and acts to prevent a separate mechanism of hazing in the PET polymer.

The present invention is generally directed to multilayer polymeric reflectors that are light-reflecting multilayer optical films (such as multilayer optical films) and their manufacture, as well as the use of the multilayer optical films as mirrors and in light directing and light providing articles. These multilayer optical films include multilayer optical films, methods of making and using these multilayer optical films, and articles incorporating the multilayer optical films. The multilayer optical films reflect light over a wavelength range (e.g., all or a portion of the visible, IR, or UV spectrum, but most typically all or a portion of the visible wavelength range). The multilayer optical films are typically coextruded and oriented multilayer structures that differ from previous optical bodies, at least in part, due to the selection of materials which can provide advantages in processing, optical properties, mechanical properties, durability, weatherability, and economic and other advantages. While the present invention is not so limited, an appreciation of various aspects of the invention will be gained through a discussion of the examples provided below.

The term "birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. For an oriented polymer, the x-axis is generally chosen to be the in-plane direction with the largest index of refraction, which typically corresponds to one of the directions in which the optical body is oriented (e.g., stretched). The term "in-plane birefringence" is the absolute value of the difference between the in-plane indices ($n_x$ and $n_y$) of refraction.

The term "polymer" will be understood, unless otherwise indicated, to include polymers and copolymers (i.e., polymers formed from two or more monomers including terpolymers, etc.), as well as polymers or copolymers which can be formed in a miscible blend by, for example, coextrusion or reaction, including transesterification. Block, random, graft, and alternating copolymers are included, unless indicated otherwise.

All birefringence and index of refraction values are reported for 632.8 nm light unless otherwise indicated.

Multilayer Optical Films

Certain multilayer optical films are described in U.S. Pat. No. 7,141,297 and references cited therein, all of which are incorporated herein by reference.

Figure 5:
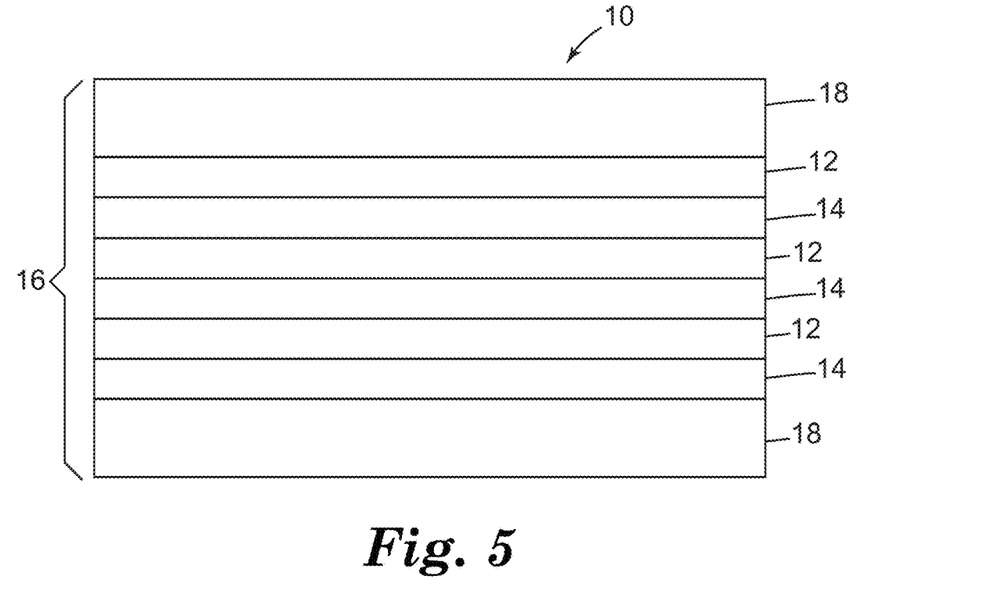
FIG. 5 is a schematic cross-sectional diagram of a first embodiment of a multilayer optical body.
Figure 6:
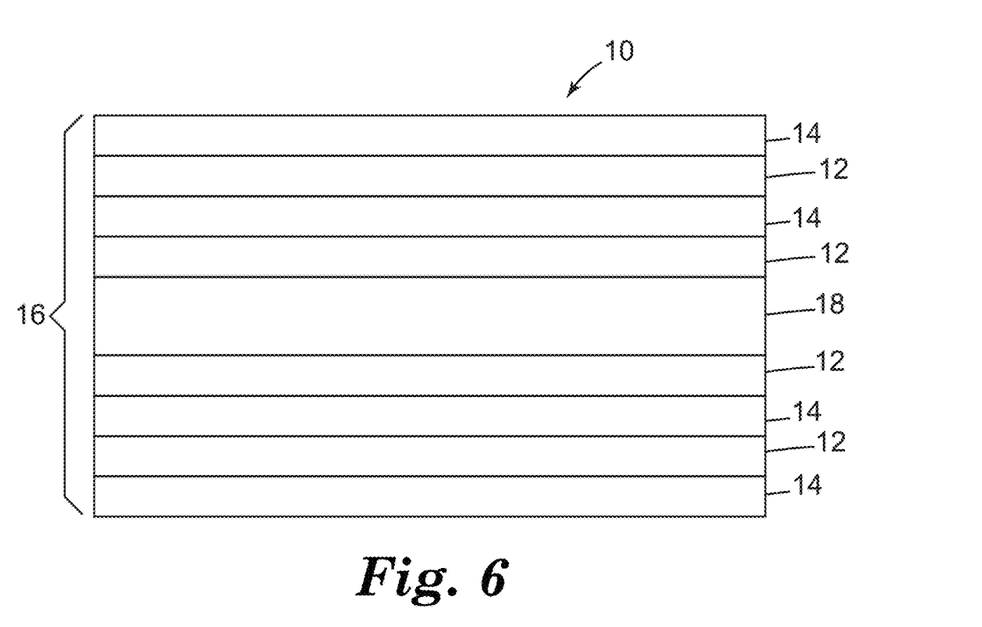
FIG. 6 is a schematic cross-sectional diagram of a second embodiment of a multilayer optical body.

FIGS. 5 and 6 illustrate multilayer optical bodies 10 (e.g., multilayer optical films) that can be used as, for example, a mirror, a polarizer, an IR film, a UV film, or a color-shifting film and light source 20. The optical bodies 10 include one or more first optical layers 12, one or more second optical layers 14, and one or more non-optical layers 18. The non-optical layers 18 can be disposed on a surface of the multilayer optical body as a skin layer (FIG. 5) or disposed between optical layers (FIG. 6). The first and second optical layers and, optionally, the non-optical layers, if any, are coextruded and oriented by, for example, stretching. Orientation typically significantly enhances the optical power (e.g., reflectivity) of the multilayer optical bodies due to birefringence of the first or second optical layers or both.

The optical layers 12, 14 are typically interleaved to form a stack 16 of layers, optionally, with one or more of the non-optical layers 18 included within or as a skin layer of the stack. Typically the optical layers 12, 14 are arranged as alternating pairs, as shown in FIG. 5, to form a series of interfaces between layers with different optical properties. The optical layers 12, 14 are typically no more than 1 μm thick and can have a thickness of 400 nm or less. The optical layers can have the same thicknesses. Alternatively, the multilayer optical body can include layers with different thicknesses to increase the reflective wavelength range.

Although FIG. 5 shows only six optical layers 12, 14, multilayer optical bodies 10 can have a large number of optical layers. Examples of suitable multilayer optical bodies include those having about 2 to 5000 optical layers. Generally, multilayer optical bodies have about 25 to 2000 optical layers and typically about 50 to 1500 optical layers or about 75 to 1000 optical layers. It will be appreciated that, although only a single stack 16 is illustrated in FIG. 5, the multilayer optical body 10 can be made from multiple stacks that are subsequently combined to form the optical body 10.

Multilayer optical films that can be used in the present disclosure include one or more first optical layers, one or more second optical layers, and may optionally include one or more non-optical layers. The non-optical layers can be disposed on a surface of the multilayer optical film as a skin layer or disposed between optical layers. The first and second optical layers and, optionally, the non-optical layers, if any, are coextruded and oriented by, for example, stretching. Orientation typically significantly enhances the optical power (e.g., reflectivity) of the multilayer optical films due to birefringence of the first or second optical layers or both.

The optical layers are typically interleaved to form a stack of layers, optionally, with one or more of the non-optical layers included within or as a skin layer of the stack. Typically the optical layers are arranged as alternating pairs to form a series of interfaces between layers with different optical properties. The optical layers are typically no more than 1 □m thick and can have a thickness of 400 nm or less. The optical layers can have the same thicknesses. Alternatively, the multilayer optical film can include layers with different thicknesses to increase the reflective wavelength range.

Multilayer optical films can have a large number of optical layers. Examples of suitable multilayer optical films include those having about 2 to 5000 optical layers. Generally, multilayer optical films have about 25 to 700 optical layers and typically about 50 to 700 optical layers or about 75 to 700 optical layers. In some embodiments, the multilayer optical films contain no more than 700 first and second optical layers. In some embodiments, the multilayer optical films contain no more than 650 first and second optical layers. It will be appreciated that the multilayer optical film can be made from multiple stacks that are subsequently combined to form the optical body.

Additional sets of optical layers, similar to the first and second optical layers, can also be used in the multilayer optical film. The design principles disclosed herein for the sets of first and second optical layers can be applied to any additional sets of optical layers. In addition, different repeating patterns of optical layers can be used (e.g., "ABCBA . . . ", where A, B, and C are optical layers with different compositions). Some such patterns as set forth in U.S. Pat. No. 5,360,569, which is incorporated herein by reference.

The transmission and reflection characteristics of the multilayer optical films are based on coherent interference of light caused by the refractive index difference between the first and second optical layers and the thicknesses of the first and second optical layers. When the in-plane indices of refraction differ between the first and second optical layers, the interface between adjacent first and second optical layers forms a reflecting surface. The reflective power of the interface depends on the square of the difference between the in-plane indices of refraction of the first and second optical layers (e.g., $(n_{10}-n_{20})^2$, where $n_{10}$ is an in-plane refractive index of the first optical layers and $n_{20}$ is an in-plane refractive index of the second optical layers).

In mirror applications, the multilayer optical film typically includes first and second optical layers where both in-plane refractive indices differ substantially (e.g., differ by at least 0.04 and, often, by at least 0.1) between the layers (i.e., $n_{1x} \neq n_{2x}$ and $n_{1y} \neq n_{2y}$, where $n_{1x}$ and $n_{1y}$ are the in-plane refractive indices of the first optical layers and $n_{2x}$ and $n_{2y}$ are the in-plane refractive indices of the second optical layers). In polarizer applications, the multilayer optical film typically includes first and second layers where one of the in-plane refractive indices differs substantially between the layers and the other in-plane refractive index is substantially similar (e.g., $n_{1x} \neq n_{2x}$ and $n_{1y} \approx n_{2y}$). Preferably, the substantially similar in-plane refractive indices differ by no more than about 0.04. For polarizer applications, the in-plane birefringence of the first optical layers is typically at least about 0.05, preferably at least about 0.15, and more preferably at least about 0.2.

The first optical layers are made using birefringent polymers (preferably, polymers with positive birefringence) that are uniaxially- or, preferably, biaxially-oriented to increase the in-plane refractive index (or indices) of the first optical layers, thereby increasing the difference between the refractive indices of the first and second layers. In some embodiments, the second optical layers are polymer layers that are birefringent (preferably, negatively birefringent) and uniaxially- or biaxially-oriented. In other embodiments, the second optical layers are polymer layers having an isotropic index of refraction (e.g., substantially the same index of refraction in all directions) that is typically different from one or both of the in-plane indices of refraction of the first optical layers.

The first optical layers can be made birefringent by, for example, stretching the first optical layers in a desired direction or directions. For example, the first optical layers can be biaxially-oriented by stretching in two different directions. The stretching of optical layers in the two directions can result in a net symmetrical or asymmetrical stretch in the two chosen orthogonal axes. Symmetrical stretching in two directions can yield in-plane refractive indices that are substantially similar (e.g., differ by no more than 0.4). As an alternative to stretching in two directions, the first optical layers can be uniaxially-oriented by, for example, stretching the layers in a single direction. A second orthogonal direction may be allowed to neck (e.g., decrease in length, width, or thickness) into some value less than its original length. The direction of stretching typically corresponds to either in-plane axis (e.g. the x or y axis), however, other directions can be chosen.

Typically, the highest reflectivity for a particular interface between first and second optical layers occurs at a wavelength corresponding to twice the combined optical thickness of the pair of optical layers. The optical thickness describes the difference in path length between light rays reflected from the lower and upper surfaces of the pair of optical layers. For light incident at 90 degrees to the plane of the optical film (normally incident light), the optical thickness of the two layers is $n_1 d_1 + n_2 d_2$ where $n_1$, $n_2$ are the in-plane indices of refraction of the two layers and $d_1$, $d_2$ are the thicknesses of the corresponding layers. The equation $\lambda/2 = n_1 d_1 + n_2 d_2$ can be used to tune the optical layers for normally incident light. At other angles, the optical distance depends on the distance traveled through the layers (which is larger than the thickness of the layers) and the indices of refraction for at least two of the three optical axes of the layer. The optical layers can each be a quarter wavelength thick or the optical layers can have different optical thicknesses, as long as the sum of the optical thicknesses is half of a wavelength (or a multiple thereof). A multilayer optical film having more than two optical layers can include optical layers with different optical thicknesses to provide reflectivity over a range of wavelengths. For example, a multilayer optical film can include pairs or sets of layers that are individually tuned to achieve optimal reflection of normally incident light having particular wavelengths or may include a gradient of layer pair thicknesses to reflect light over a larger bandwidth.

These multilayer optical films can be designed to reflect one or both polarizations of light over at least one bandwidth. The layer thicknesses and indices of refraction of the optical stacks within the optical bodies can be controlled to reflect at least one polarization of specific wavelengths of light (at a particular angle of incidence) while being transparent over other wavelengths. Through careful manipulation of these layer thicknesses and indices of refraction along the various optical body axes, the multilayer optical film of the present invention may be made to behave as mirrors or polarizers over one or more regions of the spectrum.

For example, the optical bodies can be designed to reflect light over substantially all of the visible light region (about 400 to 750 nm) to form a visible mirror. The visible mirror may be a cold mirror, reflecting only the visible wavelengths of light and transmitting the IR, or it may be a broadband mirror that reflects both the visible and IR wavelengths. Visible mirrors are described, for example, in U.S. Pat. No. 5,882,774 and WO 97/01774, and a cold mirror is described, for example, in U.S. Pat. Nos. 5,339,198 and 5,552,927, all of which are incorporated herein by reference. For cold mirrors, the typical optical layer thickness is in the range of 100 to 200 nm. For visible/IR mirrors, the typical optical layer thickness is in the range of 100 to 600 nm (for a ¼ wavelength design).

Another embodiment is an optical body that reflects at least a portion of infrared (IR) light. To reflect light in the region from about 750 to 1200 nm, the layers have optical thicknesses ranging from about 185-300 nm (¼ the wavelength of the light desired to be reflected). For example, the optical bodies of the present invention can be tuned to reflect both polarizations of light in at least a portion of the IR region of the spectrum while being transparent over other portions of the spectrum. This type of optical body can be used as an IR film to, for example, reflect solar energy from, for example, windows of buildings and automobiles. Preferably, IR films for these uses transmit a large portion of the visible light and, more preferably, have substantially uniform transmission spectra over the visible range to avoid the appearance of color. Further description of IR films and examples of film configurations are presented in WO 97/01778, WO 99/36808, and U.S. Pat. No. 5,360,659, all of which are incorporated herein by reference.

Yet another embodiment is a multilayer optical film that reflects light over only a portion of the visible range. These optical bodies can be used as color shifting films, because as viewing angle changes, the wavelength region of reflection also changes. Further description of color changing films, principles of operation, and examples of film configurations are presented in WO 99/36257 and WO 99/36258, both of which are incorporated herein by reference. These optical bodies can be tailored to exhibit a sharp bandedge at one or both sides of at least one reflective bandwidth, thereby giving a high degree of color saturation at acute angles, if desired, as described in WO 99/36809, incorporated herein by reference.

First Optical Layers

The first optical layers are typically orientable films of polyethylene terephthalate (PET) or copolymers or blends thereof. Examples of suitable copolymers are described in, for example, WO 99/36262, and in co-pending U.S. patent application Ser. No. 09/399,531, both of which are incorporated herein by reference.

Preferred properties of the material used for the first optical layers include: 1) birefringence (preferably, positive birefringence), 2) thermal stability, 3) processing temperatures compatible with the materials of the second optical layers, 4) UV stable or protectable, 5) high clarity (e.g., high transmission and low absorption), 6) a glass transition temperature that is compatible with the second optical layers to provide strain-induced birefringence, 7) a range of viscosities to permit viscosity matching with the materials of the second optical layers, 8) good interlayer adhesion with the second optical layers, 9) low dispersion, 10) good z-index matching with the second optical layers, and 11) drawability (e.g., the ability to be stretched). Other factors include cost and commercial availability.

PET and copolymers and blends of PET as well as the other polymers listed above, can be made birefringent by, for example, stretching the first optical layers in a desired direction or directions. Orientation is typically accomplished at a temperature above the glass transition temperature of the polymer, although some copolymers with low crystallinity can be oriented at or below the glass transition temperature as described in, for example, co-pending U.S. patent application Ser. No. 09/399,531, incorporated herein by reference.

Uniaxial orientation of polyethylene terephthalate (PET) can raise the refractive index of PET in the orientation direction from 1.57 to 1.69. Biaxial orientation of PET can raise the refractive index of PET in the orientation directions from 1.57 to 1.65, while the z index of refraction decreases to 1.50, giving a birefringence of 0.13 to 0.15 between the in-plane and z-axis refractive indices.

The amount of birefringence and the amount of change in refractive index obtained for these polymers depends on a variety of factors including, for example, the draw ratio, the orientation temperature, and whether the polymer is uniaxially or biaxially oriented. Typically, the larger the draw ratio, the larger the change in refractive index. However, the achievable draw ratio can be limited by the orientation temperature.

Typically, for relatively crystalline materials, the orientation temperature is above the glass transition temperature. Generally, the closer that the orientation temperature is to the glass transition temperature, the lower the achievable draw ratio because the polymer exhibits excessive strain hardening when drawn and can crack or form microvoids. However, in general, the closer that the orientation temperature is to the glass transition temperature, the large the change in refractive index for a given draw ratio. Thus, drawing the polymer at a temperature that is substantially above (e.g., 20° C. or 30° C.) the glass transition temperature of the polymer will typically result in significantly less change in the refractive index for a given draw ratio. Thus, a balance is required between draw ratio and orientation temperature to achieve a desired refractive index change.

Material selection can influence the optical and physical properties of the multilayer optical film. Polyesters like PET include carboxylate and glycol subunits and can be generated by, for example, (a) reaction of carboxylate monomers with glycol monomers or (b) transesterification. Each carboxylate monomer has two or more carboxylic acid or ester functional groups and each glycol monomer has two or more hydroxy functional groups. Polyesters can be formed using a single type of carboxylate monomer or two or more different types of carboxylate monomers. The same applies to the glycol monomers.

The properties of a polymer layer or film vary with the particular choice of monomers. PET includes carboxylate subunits formed from terephthalic acid or esters thereof.

PET includes glycol subunits formed using ethylene glycol. Suitable glycol comonomers for forming glycol subunits of PET include propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

On the other hand, PET absorbs light at 320 nm with a tail extending to 370 nm. Thus, a UV protecting coating or additive would not need to extend into the visible range. This ability is particularly important when preparing multilayer optical films that are designed to reflect IR light and transmit visible light (e.g., solar reflective films for building and automobile windows) or optical bodies designed to reflect only a particular bandwidth in the visible range and transmitting all other light.

Suitable PET-containing multilayer optical films can be formed in a variety of configurations. Particularly useful PET-based materials include PET or PET copolymers or blends that have a glass transition temperature of no more than about 90° C., or of no more than about 80° C. or 70° C. Typically, the most useful of these PET-based materials will be free, or substantially free, of napthalene dicarboxylate (NDC) monomers. In such constructions, the material for the second optical layers generally will also include a material having a glass transition temperature of no more than about 90° C. Among the materials for suitable second optical layers are polyacrylates and aliphatic polyolefins, including blends of these polymers with other materials and copolymers. Alternatively, the first optical layers can be formed using a copolymer or blend of PET that is also substantially free of NDC monomer and that has a glass transition temperature of at least about 100° C. or at least 120° C. In such constructions, the material for the second optical layers generally will also include a material having a glass transition temperature of at least about 100° C.

As an alternative, the glass transition temperature of PET can be raised by combining PET with a second polymer that has a higher glass transition temperature. The combination of PET and the second polymer can include miscible blending to form a polymer blend or reactive blending (by, for example, transesterification) to form a copolymer. For example, PET can be blended with a second polymer that has a glass transition temperature of 130° C. or higher or a second polymer with a glass transition temperature of 160° C. or higher, or even a second polymer with a glass transition temperature of 200° C. or higher. Examples of suitable second polymers include, for example, PEN ($T_g$=130° C.), polycarbonate ($T_g$=157° C.), polyarylate ($T_g$=193° C.), or polyetherimide ($T_g$=218° C.).

Alternatively, the monomer materials of PET, e.g., terephthalic acid and ethylene glycol, can be copolymerized with the monomer materials that correspond to a second polymer having a higher glass transition temperature, such as PEN, polycarbonate, and polyarylate, to form copolymers. For example, PET can be copolymerized with monomer materials that correspond with a second polymer that has a glass transition temperature of 130° C. or higher or a second polymer with a glass transition temperature of 160° C. or higher, or even a second polymer with a glass transition temperature of 200° C. or higher.

Other copolymers of PET can also be used, including those incorporating (i) carboxylate monomer materials, such as, for example, isophthalic acid; phthalic acid; azelaic acid; adipic acid; sebacic acid; norbornene dicarboxylic acid; bi-cyclooctane dicarboxylic acid; 1,6-cyclohexane dicarboxylic acid and isomers thereof; t-butyl isophthalic acid; tri-mellitic acid; sodium sulfonated isophthalic acid; 2,2'-biphenyl dicarboxylic acid and isomers thereof; and lower alkyl esters of these acids, such as methyl or ethyl esters; and (ii) glycol monomer materials, such as, for example, propylene glycol; 1,4-butanediol and isomers thereof; 1,6-hexanediol; neopentyl glycol; polyethylene glycol; diethylene glycol; tricyclodecanediol; 1,4-cyclohexanedimethanol and isomers thereof; norbornanediol; bicyclo-octanediol; trimethylol propane; pentaerythritol; 1,4-benzenedimethanol and isomers thereof; bisphenol A; 1,8-dihydroxy biphenyl and isomers thereof; and 1,3-bis(2-hydroxyethoxy)benzene.

Second Optical Layers

The second optical layers can be prepared with a variety of optical and physical properties depending, at least in part, on the desired operation of the film. Preferred properties of the second optical layers include, for example, 1) isotropic or negative birefringence, 2) thermal stability, 3) processing temperatures compatible with the materials of the first optical layers, 4) UV stable or protectable, 5) high clarity (e.g., high transmission and low absorption), 6) a glass transition temperature that is compatible with the first optical layers to provide strain-induced birefringence, 7) a range of viscosities to permit viscosity matching with the materials of the first optical layers, 8) good interlayer adhesion with the first optical layers, 9) low dispersion, 10) good z-index matching with the first optical layers, and 11) drawability (e.g., the ability to be stretched). Other factors include cost and commercial availability.

In some embodiments, the second optical layers are made of a polymer material that does not appreciably optically orient when stretched under conditions that are used to orient the first optical layers. Such layers are particularly useful in the formation of reflective optical bodies, because they allow the formation of a stack of layers by, for example, coextrusion, which can then be stretched to orient the first optical layers while the second optical layers remain relatively isotropic (e.g., an in-plane birefringence of 0.05 or less). In other embodiments, the second optical layers are orientable and are, preferably, negatively birefringent (when the first optical layers are positively birefringent) so that the in-plane refractive indices decrease with orientation.

There are a variety of considerations in the selection of the materials for the first and second optical layers. The importance of these considerations typically depends on the desired optical properties and uses for the optical bodies. One consideration is the glass transition temperature of the second optical layers. Typically, the materials of the first and second optical layers are selected so that the glass transition temperature of the second optical layers is not substantially higher than the glass transition temperature of the first optical layers. More preferably, the glass transition temperature of the second optical layers is equal to or less than the glass transition temperature of the first optical layers. If the glass transition temperature of the second optical layers is too high, orientation of the first optical layers at a suitable orientation temperature near the glass transition temperature of the first optical layers can cause excessive strain hardening in the second optical layers. This can diminish the optical quality of the second optical layers by, for example, introducing cracks or microvoids. The glass transition temperature of an optical layer is defined as the glass transition temperature of the composition that is used to form the optical layer and not the glass transition temperature(s) of the individual components.

Another consideration is the difference in the z-axis refractive indices between the first and second optical layers. When the z-axis refractive indices of the two layers are equal, the reflectance of p-polarized light does not depend on the incident angle of light. This feature can be useful when reflectance uniformity over a range of viewing angles is desired. In such embodiments, the difference in z-axis refractive indices between the first and second optical layers is preferably no more than about 0.04 and, by selection of materials can be made no more than about 0.02 or no more than about 0.01.

Another consideration is the decomposition temperature of the polymer(s) selected for use in the second optical layers. Typical coextrusion processing temperatures for PET are above about 250° C. Degradation of the components of the second optical layers can produce defects in the optical body, such as, for example, discoloration and regions of gel formation. Materials that do decompose at the processing temperatures can still be used if the decomposition does not result in unacceptable properties.

The second optical layers can be made using a variety of polymeric compositions. The description of suitable polymers with respect to particular optical body configurations is provided below.

One aspect of this invention utilizes polymethylmethacrylate/polyvinylidene fluoride blends (PMMA/PVDF) in the second optical layers as low refractive index materials. The PMMA/PVDF blends are particularly useful with polyester high refractive index materials, for example aromatic polyesters such as polyethylene terephthalate (PET), as well as blends and copolymers thereof.

The polymers used in multilayer optical films should be clear so that light is not lost by scattering or absorption. Many applications involve multiple interactions between light and the optical film, which magnify the adverse affects of scattering and absorption. Optical polymers such as PMMA are considered sufficiently clear for most purposes, with transmission in the visible region of the spectrum at 92%. PVDF has a transmission of 96%. PMMA/PVDF miscible blends have higher transmission (clarity) than PMMA.

PMMA/PVDF miscible blends have a lower refractive index than PMMA (n=1.49) due to the low index of PVDF (n=1.42). The larger index difference results in greater optical power in the multilayer film. The refractive index for a PMMA/PVDF (60/40) (by weight) miscible blend is about 1.458. The larger index difference provided by the PMMA/PVDF blend relative to PMMA also results in a significant dampening of color leaks as well as higher reflectivity.

Multilayer films using PET require high coextrusion temperatures (greater than or equal to about 250° C.) due to the high melting points of these polyesters. Second optical layers that are not thermally stable can cause flow instabilities in the multilayer film due to viscosity loss associated with degradation. Degradation products also may result in point defects or discoloration in the optical film. PMMA/PVDF miscible blends are more thermally stable than PMMA.

Thus, by blending PVDF with PMMA, a low refractive index material (for the second optical layers) with improved properties is achieved. Such blends have a lower refractive index and a lower glass transition temperature as compared to PMMA, while at least maintaining suitable performance in properties such as clarity, viscosity, thermal stability and interlayer adhesion. In particular, the blends, when coextruded with PET as the high refractive index material (for the first optical layers), exhibit properties such as excellent clarity (e.g. transmission>90%), low refractive index (n≤1.49), viscosity similar to that of the high refractive index material, thermal stability at temperatures greater than 250° C., glass transition temperature ($T_g$) below that of the high refractive index material; and good interlayer adhesion with the high refractive index material.

The particular PMMA and PVDF used in the blends to provide a low refractive index material are not limited so long as the materials are sufficiently miscible with each other and the resultant blend can be coextruded with the high refractive index material to form the multilayer film. For example, PMMA sold under the designations Perspex™ CP80 and CP82 by ICI Americas, Inc. (Wilmington, Del.) and PVDF sold under the designation Solef™ 1008/0001 by Solway are useful with PET high refractive index materials.

The amount of PVDF used in the blends is more than and not equal to about 40% by weight and more typically about 50% by weight (i.e. a 50/50 PMMA/PVDF blend).

Non-Optical Layers

One or more of the non-optical layers can be formed as a skin layer or skin layers over at least one surface of a stack to, for example, protect the optical layers from physical damage during processing and/or afterwards. In addition or alternatively, one or more of the non-optical layers can be formed within the stack of layers to, for example, provide greater mechanical strength to the stack or to protect the stack during processing.

The non-optical layers ideally do not significantly participate in the determination of optical properties of the multilayer optical film, at least across the wavelength region of interest (e.g., visible, IR or UV wavelength regions). The non-optical layers may or may not be birefringent or orientable. Typically, when the non-optical layers are used as skin layers there will be at least some surface reflection. In at least some applications where high transmission of light is desired, the non-optical layers preferably have an index of refraction that is relatively low (e.g., no more than 1.6 or, preferably, no more than 1.5) to decrease the amount of surface reflection (e.g., iridescence). In other applications where reflectivity of light is desired, the non-optical layers preferably have a relatively high refractive index (e.g., at least 1.6, more preferably at least 1.7) to increase reflectance of the multilayer optical film.

When the non-optical layers are found within the stack, there will typically be at least some polarization or reflection of light by the non-optical layers in combination with the optical layers adjacent to the non-optical layers. In at least some instances, however, the non-optical layers can be selected to have a thickness that dictates that light reflected by the non-optical layers within the stack has a wavelength outside the region of interest, for example, in the infrared region for optical bodies that reflect visible light. The thickness of the non-optical layers can be at least two times, typically at least four times, and, in many instances, at least ten times, the thickness of one of the individual optical layers. The thickness of the non-optical layers can be varied to make an optical film having a particular thickness. Typically, one or more of the non-optical layers are placed so that at least a portion of the light to be transmitted, polarized, and/or reflected by the optical layers, also travels through the non-optical layers (i.e., the non-optical layers are placed in the path of light which travels through or is reflected by the optical layers).

The non-optical layers are formed from polymers including any of the polymer used in the first and second optical layers. In some embodiments, the material selected for the non-optical layers is similar to or the same as the material selected for the second optical layers. Materials may be chosen for the non-optical layers that impart or improve properties such as, for example, tear resistance, puncture resistance, toughness, weatherability, and solvent resistance of the multilayer optical film.

Other Layers and Coatings

Various functional layers or coatings can be added to the multilayer optical films of the present invention to alter or improve their physical or chemical properties, particularly along the surface of the multilayer optical film. Such layers or coatings may include, for example, slip agents, low adhesion backside materials, conductive layers, antistatic coatings or films, barrier layers, flame retardants, UV stabilizers, abrasion resistant materials, optical coatings, and/or substrates designed to improve the mechanical integrity or strength of the film or device, as described in WO 97/01440, which is herein incorporated by reference. Dichroic polarizing films can also be coated on or co-extruded with the multilayer optical films, as described, for example, in WO 95/17691, WO 99/36813, and WO 99/36814, all of which are herein incorporated by reference.

Manufacturing

A brief description of one method for forming multilayer optical films is provided. A fuller description of the process conditions and considerations is found in PCT Publications Nos. WO 99/36248, WO 99/06203, and WO 99/36812, all of which are incorporated herein by reference.

An initial step in the manufacture of the multilayer optical films is the generation of the polymers to be used in formation of the first and second optical layers, as well as the non-optical layers (unless the polymers are available commercially). Typically, these polymers are formed by extrusion, although other methods of polymer formation can may be used. Extrusion conditions are chosen to adequately feed, melt, mix and pump the polymer resin feed streams in a continuous and stable manner. Final melt stream temperatures are chosen to be within a range that reduces freezing, crystallization, or unduly high pressure drops at the low end of the range and that reduces degradation at the high end of the range. The entire melt stream processing of more than one polymer, up to and including film casting on a chill roll, is often referred to as co-extrusion.

Preferably, the polymers of the first optical layers, the second optical layers, and the non-optical layers are chosen to have similar rheological properties (e.g., melt viscosities) so that they can be co-extruded. Typically, the second optical layers and the non-optical layers have a glass transition temperature, $T_g$, that is either below or no greater than about 30° C. above the glass transition temperature of the first optical layers. Preferably, the glass transition temperature of the second optical layers and the non-optical layers is below the glass transition temperature of the first optical layers.

Following extrusion, each melt stream is conveyed to a gear pump used to regulate the continuous and uniform rate of polymer flow. A static mixing unit can be used to carry the polymer melt stream from the gear pump into a multilayer feedblock with uniform melt stream temperature. The entire melt stream is typically heated as uniformly as possible to enhance both uniform flow of the melt stream and reduce degradation during melt processing.

Multilayer feedblocks divide each of the two or more polymer melt streams into many layers, interleave these layers, and combine the many layers into a single multilayer stream. The layers from any given melt stream are created by sequentially bleeding off part of the stream from a main flow channel into side channel tubes which lead to layer slots in the feed block manifold. The layer flow can be controlled by choices made in machinery, as well as the shape and physical dimensions of the individual side channel tubes and layer slots.

The side channel tubes and layer slots of the two or more melt streams are often interleaved to form alternating layers. The feedblock's downstream-side manifold is typically shaped to compress and uniformly spread the layers of the combined multilayer stack transversely. Thick, non-optical layers, known as protective boundary layers (PBLs), can be fed near the manifold walls using the melt streams of the optical multilayer stack, or by a separate melt stream. As described above, these non-optical layers can be used to protect the thinner optical layers from the effects of wall stress and possible resulting flow instabilities.

The multilayer stack exiting the feedblock manifold enters a final shaping unit such as a die. Alternatively, the stream can be split, preferably normal to the layers in the stack, to form two or more multilayer streams that can be recombined by stacking. The stream can also be split at an angle other than normal to the layers. A flow channeling system that splits and stacks the streams is called a multiplier. The width of the split streams (i.e., the sum of the thicknesses of the individual layers) can be equal or unequal. The multiplier ratio is defined as the ratio of the wider to narrower stream widths. Unequal streams widths (i.e., multiplier ratios greater than unity) can be useful in creating layer thickness gradients. In the case of unequal stream widths, the multiplier may spread the narrower stream and/or compress the wider stream transversely to the thickness and flow directions to ensure matching layer widths upon stacking.

Prior to multiplication, additional non-optical layers can be added to the multilayer stack. These non-optical layers may perform as PBLs within the multiplier. After multiplication and stacking, some of these layers can form internal boundary layers between optical layers, while others form skin layers.

After multiplication, the web is directed to a final shaping unit. The web is then cast onto a chill roll, sometimes also referred to as a casting wheel or casting drum. This casting is often assisted by electrostatic pinning, the details of which are well-known in the art of polymer film manufacture. The web can be cast to a uniform thickness across the web or a deliberate profiling of the web thickness can be induced using die lip controls.

The multilayer web is then uniaxially or biaxially drawn to produce the final multilayer optical film. Uniaxial drawing is performed in a tenter or a length orienter. Biaxial drawing typically includes both types of equipment. Typical tenters draw in a transverse direction (TD) to the web path, although certain tenters are equipped with mechanisms to draw or relax (shrink) the film dimensionally in the web path or machine direction (MD). Length orienters draw in the machine direction.

For example, a two step drawing process is used to orient the birefringent material in both in-plane directions. The draw processes can be any combination of the single step processes described above that allow drawing in two in-plane directions. In addition, a tenter that allows drawing along the machine direction, e.g. a biaxial tenter which can draw in two directions sequentially or simultaneously, can be used. In this latter case, a single biaxial draw process can be used.

In some embodiments, the film is annealed prior to subsequent processing or use. Typically the film is annealed at an annealing temperature of between 70 and 95 degrees C. Typically the film is annealed for at least 20 seconds at a temperature of between 80 and 95 degrees C. More typically the film is annealed for at least 25 seconds at a temperature of between 80 and 95 degrees C. More typically the film is annealed for at least 30 seconds at a temperature of between 80 and 95 degrees C. More typically the film is annealed for at least 35 seconds at a temperature of between 80 and 95 degrees C. In some embodiments the film is annealed for at least two minutes at a temperature of between 70 and 95 degrees centigrade. In some embodiments the film is annealed for at least one hour at a temperature of between 70 and 95 degrees centigrade. In some embodiments the film is held under no tension in any dimension during annealing. In some embodiments the film is held under no tension in at least one in-plane dimension during annealing. In some embodiments the film is held under no tension in one in-plane dimension and low tension in a perpendicular in-plane dimension during annealing.

In some embodiments, the multilayer polymeric reflector according to the present disclosure is used to form a reflective panel for mounting on an architectural structure such as a building, walkway, bridge, or the like. The panel may comprise a multilayer polymeric reflector according to the present disclosure and support elements adapted for mounting to an architectural structure. Support elements may include elements selected from framing members, mounting brackets, adhesive, connectors, mounting pins, anchors, and the like, and any combination thereof. The multilayer polymeric reflector may be semi-specular at visible wavelengths. In some embodiments, the multilayer polymeric reflector is at least 50% specular at visible wavelengths. In some embodiments, the multilayer polymeric reflector is no more than 90% specular at visible wavelengths. In some embodiments, the multilayer polymeric reflector is no more than 80% specular at visible wavelengths. In some embodiments, the multilayer polymeric reflector is no more than 70% specular at visible wavelengths. In some embodiments, two or more reflective panels are mounted on opposing sides of a gap formed between two architectural structures or two portions of a single architectural structure so as to increase the propagation of sunlight from the top of the gap to locations farther down the gap. In some embodiments the gap is a courtyard, airshaft, or recess in a single building. In some embodiments the gap is a courtyard, airshaft, recess, alleyway or separation formed between two or more architectural structures. In some embodiments, two or more reflective panels are mounted on at least two opposing surfaces. In some embodiments, reflective panels are mounted on at least 50% of the area of at least two opposing surfaces. In some embodiments, two or more reflective panels are mounted on at least two opposing and substantially parallel surfaces. In some embodiments, reflective panels are mounted on at least 50% of the area of at least two opposing and substantially parallel surfaces. In some embodiments, four or more reflective panels are mounted on at least two pair of opposing surfaces. In some embodiments, reflective panels are mounted on at least 50% of the area of at least two pair of opposing surfaces. In some embodiments, four or more reflective panels are mounted on at least two pair of opposing and substantially parallel surfaces. In some embodiments, reflective panels are mounted on at least 50% of the area of at least two pair of opposing and substantially parallel surfaces.

Selected Embodiments

The following numbered embodiments are intended to further illustrate the present disclosure but should not be construed to unduly limit this disclosure.

1. A multilayer polymeric reflector comprising:
   a) a plurality of first optical layers, each first optical layer comprising a polyester having terephthalate comonomer units and ethylene glycol comonomer units, said polyester having a glass transition temperature, wherein each first optical layer is oriented, and
   b) a plurality of second optical layers disposed in a repeating sequence with the plurality of first optical layers, each second optical layer comprising a blend of polymethyl methacrylate (PMMA) and polyvinylidene fluoride (PVDF), wherein said blend has a glass transition temperature less than the glass transition temperature of the polyester comprising the first optical layers, and wherein the amount of PVDF in the PMMA/PVDF blend is greater than and not equal to about 40% and not more than about 65%; wherein the multilayer polymeric reflector has a reflectivity of greater than 97.8% in a visible wavelength region and a transmission haze value of less than 50% in a visible wavelength region.

2. The multilayer polymeric reflector according to embodiment 1 wherein the amount of PVDF in the PMMA/PVDF blend is greater than 45%.

3. The multilayer polymeric reflector according to embodiment 1 wherein the amount of PVDF in the PMMA/PVDF blend is greater than or equal to about 50%.

4. The multilayer polymeric reflector according to embodiment 1 wherein the amount of PVDF in the PMMA/PVDF blend is about 50%.

5. The multilayer polymeric reflector according to any of embodiments 1-4, wherein the multilayer polymeric reflector has a reflectivity of greater than 98.0%.

6. The multilayer polymeric reflector according to any of embodiments 1-4, wherein the multilayer polymeric reflector has a reflectivity of greater than 98.2%.

7. The multilayer polymeric reflector according to any of embodiments 1-6 wherein the total number of first and second layers is no more than 700.

8. The multilayer polymeric reflector according to any of embodiments 1-6 wherein the total number of first and second layers is no more than 650.

9. The multilayer polymeric reflector according to any of embodiments 1-8, wherein the multilayer polymeric reflector resists shrinkage in use, to the extent that it demonstrates shrinkage of less than 1.5% in the total of width plus length following an exposure of 15 minutes to a temperature of 120 degrees centigrade.

10. The multilayer polymeric reflector according to embodiment 9, wherein the multilayer polymeric reflector demonstrates shrinkage of less than 1.0%.

11. The multilayer polymeric reflector according to embodiment 9, wherein the multilayer polymeric reflector demonstrates shrinkage of less than 0.5%.

12. The multilayer polymeric reflector according to embodiment 9, wherein the multilayer polymeric reflector demonstrates shrinkage of less than 0.2%.
13. The multilayer polymeric reflector according to any of embodiments 1-12, wherein the multilayer polymeric reflector has a transmission haze value of less than 46% in a visible wavelength region.
14. The multilayer polymeric reflector according to embodiment 13, wherein the multilayer polymeric reflector has a transmission haze value of less than 42% in a visible wavelength region.
15. The multilayer polymeric reflector according to embodiment 13, wherein the multilayer polymeric reflector has a transmission haze value of less than 30% in a visible wavelength region.
16. The multilayer polymeric reflector according to embodiment 13, wherein the multilayer polymeric reflector has a transmission haze value of less than 20% in a visible wavelength region.
17. The multilayer polymeric reflector according to embodiment 13, wherein the multilayer polymeric reflector has a transmission haze value of less than 10% in a visible wavelength region.
18. The multilayer polymeric reflector according to any of embodiments 1-5, wherein the first and second optical layers are coextruded.
19. The multilayer polymeric reflector according to any of embodiments 1-18, wherein the first optical layers are biaxially oriented.
20. The multilayer polymeric reflector according to any of embodiments 1-19, wherein the multilayer polymeric reflector is annealed at an annealing temperature of between 70 and 95 degrees centigrade for at least 30 seconds.
21. The multilayer polymeric reflector according to embodiment 20, wherein the multilayer polymeric reflector is annealed at an annealing temperature of between 80 and 95 degrees centigrade for at least 30 seconds.
22. The multilayer polymeric reflector according to embodiment 20, wherein the multilayer polymeric reflector is annealed at an annealing temperature of between 80 and 95 degrees centigrade for at least 35 seconds.
23. The multilayer polymeric reflector according to embodiment 20, wherein the multilayer polymeric reflector is annealed at an annealing temperature of between 70 and 95 degrees centigrade for at least two minutes.
24. The multilayer polymeric reflector according to embodiment 20, wherein the multilayer polymeric reflector is annealed at an annealing temperature of between 70 and 95 degrees centigrade for at least one hour.
25. The multilayer polymeric reflector according to any of embodiments 1-24, additionally comprising an optically clear UV-rejecting acrylic coating layer.
26. The multilayer polymeric reflector according to any of embodiments 1-25, additionally comprising an adhesive layer.
27. The multilayer polymeric reflector according to any of embodiments 1-26, which is specular or semi-specular at visible wavelengths.
28. The multilayer polymeric reflector according to any of embodiments 1-26, which is at least 50% specular at visible wavelengths.
29. An article comprising:
   a) a light source; and
   b) the multilayer polymeric reflector according to any of embodiments 1-28 situated so as to reflect light emitted by the light source.
30. The article according to embodiment 29 wherein the light source is an LED.
31. The article according to embodiment 29 or 30 which is a luminaire.
32. The article according to embodiment 29 or 30 which is a light bulb.
33. An article comprising the multilayer polymeric reflector according to any of embodiments 1-28 situated so as to receive and reflect sunlight.
34. An article comprising the multilayer polymeric reflector according to any of embodiments 1-28 situated so as to receive and reflect direct sunlight.
35. An article comprising the multilayer polymeric reflector according to any of embodiments 1-28 situated so as to receive and reflect concentrated sunlight.
36. The article according to any of embodiments 29-35 which is designed for outdoor use.
37. The article according to any of embodiments 29-35 installed for outdoor use.
38. The article according to any of embodiments 29-37 wherein the multilayer polymeric reflector is directly exposed to ambient outdoor light.
39. The article according to any of embodiments 29-37 wherein the multilayer polymeric reflector is directly exposed to ambient outdoor light and ambient outdoor air.
40. The film according to any of embodiments 1-28 installed for outdoor use.
41. The film according to embodiment 40 wherein the multilayer polymeric reflector is directly exposed to ambient outdoor light.
42. The film according to embodiment 40 wherein the multilayer polymeric reflector is directly exposed to ambient outdoor light and ambient outdoor air.
43. A reflective panel which is the article according to embodiment 33 additionally comprising support elements adapted for mounting to an architectural structure.
44. The reflective panel according to embodiment 43 wherein the multilayer polymeric reflector is at least 50% specular at visible wavelengths and no more than 90% specular at visible wavelengths.
45. The reflective panel according to embodiment 43 wherein the multilayer polymeric reflector is at least 50% specular at visible wavelengths and no more than 80% specular at visible wavelengths.
46. An arrangement of two or more reflective panels articles according to any of embodiments 43-45, wherein two or more reflective panels are mounted on at least two opposing surfaces of an architectural structure.
47. An arrangement of two or more reflective panels articles according to any of embodiments 43-45, wherein two or more reflective panels are mounted on at least two opposing surfaces of two or more architectural structures.
48. An arrangement of two or more reflective panels articles according to any of embodiments 43-45, wherein reflective panels are mounted on at least 50% of at least two opposing and substantially parallel surfaces an architectural structure.
49. An arrangement of two or more reflective panels articles according to any of embodiments 43-45, wherein reflective panels are mounted on at least 50% of at least two opposing and substantially parallel surfaces two or more architectural structures.
50. An arrangement of two or more reflective panels articles according to any of embodiments 43-45, wherein reflective panels are mounted on at least 50% of at least two pair of opposing and substantially parallel surfaces.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

The following films were made by coextrusion and biaxial orientation of two optical layer materials according to methods described above.

"ESR" is a comparative film composed of 265 PEN first optical layers alternating in an interleaved fashion with 265 PMMA second optical layers, additionally composed of PEN outer skin layers, having a reflectivity of 99.50% and a physical caliper of about 2.6 mil.

"DESR" is a comparative film composed ESR and an additional acrylic UV coating.

"PETb-ESR" is an exemplary film composed of 325 PET first optical layers alternating in an interleaved fashion with 325 PMMA/PVDF (50/50) second optical layers, additionally composed of PET outer skin layers, having a reflectivity of about 98% and a physical caliper of about 3.2 mil.

"PETb-DESR" is an exemplary film composed PETb-ESR and an additional acrylic UV coating.

Average Reflectance

Reflectance was measured in the visible range according to ASTM E1164-02/E308-01 using a Lambda 1050 Spectrometer for 4 different examples of PETb-ESR and for two comparative films: "PETb-ESR30", which was similar to PETb-ESR except that the second optical layers were PMMA/PVDF (70/30), and "PETb-ESR40", which was similar to PETb-ESR except that the second optical layers were PMMA/PVDF (60/40). None of the films were annealed or heat treated. Results are reported in Table I.

TABLE I

| Example | Average Reflectance |
|---|---|
| PETb-ESR (Average of four) | ~98.2% |
| PETb-ESR40 (Comparative) | ~97.2% |
| PETb-ESR30 (Comparative) | ~96.2% |

UV Light Resistance of PET Based ESR Films

Figure 1:
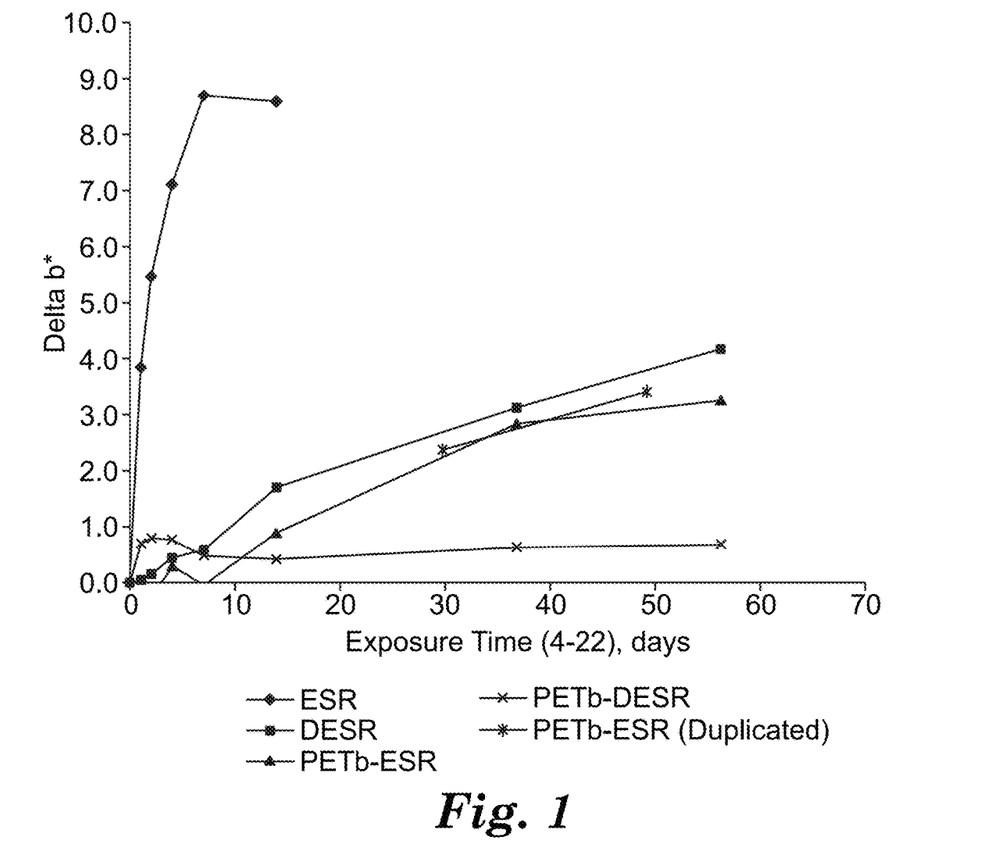
FIG. 1 is a graph demonstrating UV light resistance of multilayer polymeric reflector material according to the present disclosure and comparative material, as described in the Examples.

UV light resistance was measured under black light UV exposure (radiant flux 87 W/m$^2$ with 340 nm peak) for comparative ESR and DESR films and exemplary PETb-ESR (two examples) and PETb-DESR films. UV exposure was on the reflective side of the reflector. Yellowing (change in b*) was measured on the reflective side of the reflector using a spectrophotometer (model CM-5) made by Konica Minolta. The results are reported in the graph of FIG. 1.

The comparative PEN based film "ESR" yellowed noticeably (b* increased by 4) in 25 hours. For the exemplary PET based film "PETb-ESR", b* increased by only 3.2 after exposure for more than 56 days. For the exemplary PET based film with UV coating, "PETb-DESR", b* increased negligibly even after 56 days under black light.

High Intensity Visible Light Durability

The comparative PEN based film "ESR" and exemplary PET based film "PETb-ESR" were additionally tested for durability under high intensity LED-source white light and blue light. The exemplary PET based film "PETb-ESR" withstood 80 times longer exposure without noticeable yellowing in comparison to the comparative PEN based film "ESR".

Reduced Shrinkage by Heat Stabilization Process

Figure 2:
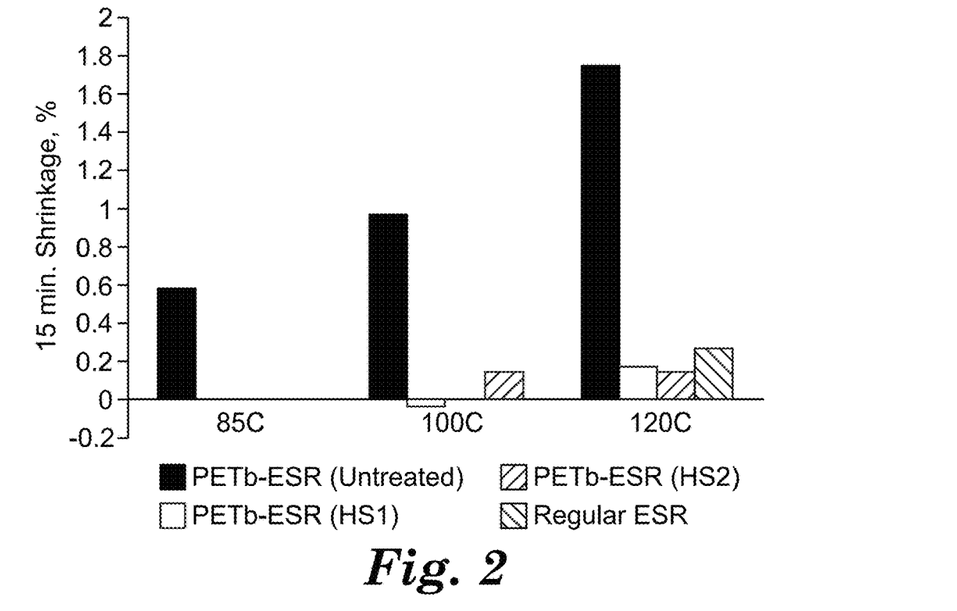
FIG. 2 is a graph demonstrating shrinkage of multilayer polymeric reflector material according to the present disclosure and comparative material, as described in the Examples.

Four films were tested for shrinkage, comparative film ESR (designated "Regular ESR" in FIG. 2), and three exemplary films: PETb-ESR (designated "PETb-ESR(untreated)" in FIG. 2), and two heat stabilized samples of PETb-ESR, designated "PETb-ESR(HS1)" and "PETb-ESR (HS2)". PETb-ESR(HS1) was pretreated by heating to 140 degrees C. for 5 minutes. PETb-ESR(HS2) was pretreated by heating to 150 degrees C. for 30 minutes. All four were measured for shrinkage after a 15 minute exposure to 85 degrees C., 100 degrees C., and 120 degrees C. temperatures. The results are reported in the graph of FIG. 2.

Without heat stabilization, the PET based PETb-ESR film has a disadvantage relative to the comparative PEN based ESR in that it demonstrates higher shrinkage at temperature above 60° C. This is thought to be due to low glass transition temperature of PET (70 C) and low glass transition temperature of PMMA/PVDF blend (50 C). The present disclosure contemplates annealing PET based films by heating up to 20~30 degree C. higher than the target application temperature at low tension or no tension.

Haze Measurements

Figure 3:
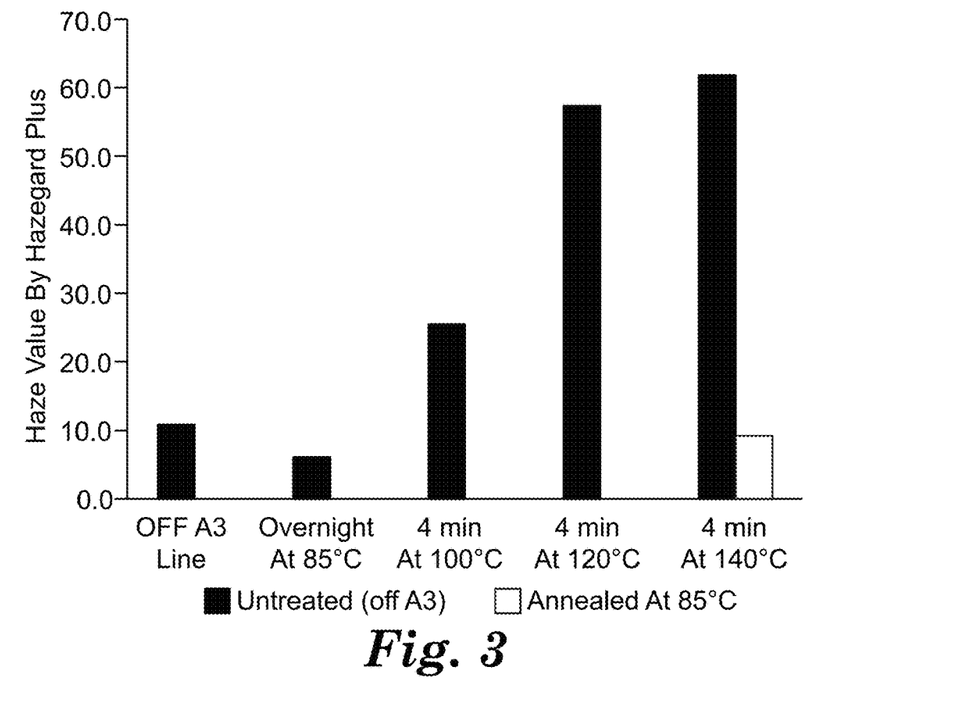
FIG. 3 is a graph demonstrating haze level of multilayer polymeric reflector material according to the present disclosure, as described in the Examples.

Haze values were measured for various films by Hazegard+. Haze values were measured for light transmitted through the film. Unless otherwise specified, haze was measured at the back side of the film ("back side measurement"), with a light source at the reflective side of the film. Alternately, haze can be measured at the reflective side of the film ("reflective side measurement"), with a light source at the back side of the film. The graph of FIG. 3 reports results for an untreated PETb-ESR film (designated "off A3 line") and PETb-ESR films subjected to various heat histories. It can readily be seen that the samples annealed at 85 degrees C. resisted hazing.

Additional haze values were measured for PETb-ESR40, which are reported in Table II.

TABLE II

| | Reflective Side Measurement | Back Side Measurement |
|---|---|---|
| Before heating | 5.8 | 12.5 |
| Heated to 150 C. for 5 min | 10.1 | 19.4 |

Additional haze values were measured for PETb-ESR after processing through a three-stage oven. The three stage temperatures were set to 82 degrees C., 148 degrees C. and 148 degrees C., to provide annealing and subsequent heat stabilization. Measured haze values are reported in Table III.

TABLE III

| 82 degree C. dwell time | 148 degree C. dwell time | Reflective Side Haze Measurement | Back Side Haze Measurement |
|---|---|---|---|
| 180 sec | 450 sec | 23.5 | 43.6 |
| 90 sec | 225 sec | 29.6 | 49.2 |
| 51 sec | 129 sec | 25.6 | 45.5 |
| 36 sec | 90 sec | 23.7 | 41.2 |

Clear UV Coat Layer Found to Eliminate Oligomer Migration/Crystallization

Figure 4A:
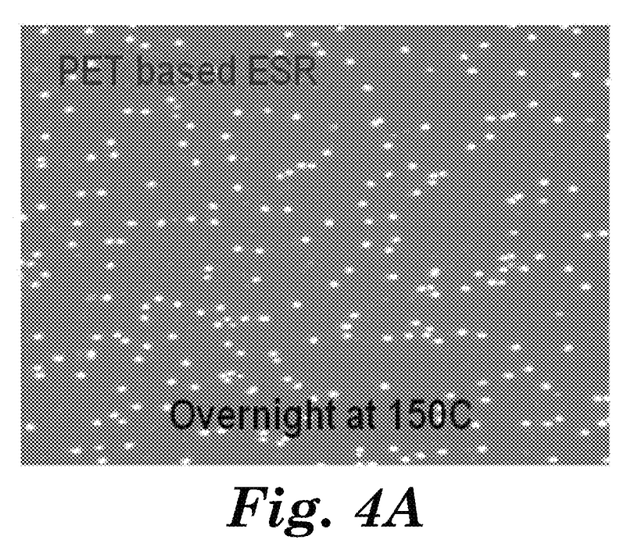
FIG. 4a and FIG. 4b are micrographs of multilayer polymeric reflector material according to the present disclosure demonstrating reduction of haze by addition of a clear UV coat, as described in the Examples.
Figure 4B:
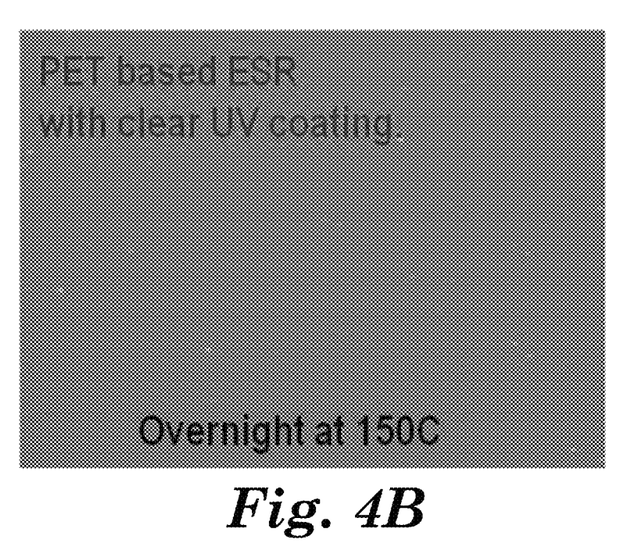

PETb-ESR and PETb-DESR samples were held at 150 degrees C. for 15 hours and examined for PET surface haze. It is believed that the mechanism of formation for this type of haze is the migration of PET oligomer crystals to the surface of the outermost PET layer of the film. As demonstrated in FIG. 4, application of the clear UV coat eliminated this mechanism of hazing.

Outdoor Exposure Testing

Comparative ESR and DESR films and exemplary PETb-ESR and PETb-DESR films were subjected to outdoor exposure testing at New River, Ariz., USA, using test methods ASTM G147-2009 and ASTM G90-2010 (no water spray) over an 83 day period. Radiant Energy measured was:

UV: 270 MJ/m2 (295~385 nm)
Total radiation: 10,592 MJ/m2 b* and photopic weighted reflectance were measured before and after exposure. The results are reported in Table IV.

TABLE IV

| Example | b* (yellowing) | | | Photopic weighted reflectance (%) | | |
|---|---|---|---|---|---|---|
| | initial | final | change | initial | final | change |
| ESR (comparative) | 0.5 | 15.7 | +15.3 | 99.2 | 91.5 | −7.7 |
| DESR (comparative) | 0.7 | 4.9 | +4.2 | 99.2 | 98 | −1.2 |
| PETb-ESR (exemplary) | −0.1 | 1.4 | +1.5 | 98.9 | 98.2 | −0.7 |
| PETb-DESR (exemplary) | 0.1 | 0.5 | +0.4 | 98.9 | 98.7 | −0.2 |

Various modifications and alterations of this disclosure will become apparent to those skilled in the art without departing from the scope and principles of this disclosure, and it should be understood that this disclosure is not to be unduly limited to the illustrative embodiments set forth hereinabove.

I claim:

1. A multilayer polymeric reflector comprising:
   a) a plurality of first optical layers, each first optical layer comprising a polyester having terephthalate comonomer units and ethylene glycol comonomer units, said polyester having a glass transition temperature, wherein each first optical layer is oriented, and
   b) a plurality of second optical layers disposed in a repeating sequence with the plurality of first optical layers, each second optical layer comprising a blend of polymethyl methacrylate (PMMA) and polyvinylidene fluoride (PVDF), wherein said blend has a glass transition temperature less than the glass transition temperature of the polyester comprising the first optical layers, and wherein an amount of PVDF in the PMMA/PVDF blend is greater than and not equal to about 40% and not more than about 65%;
wherein the multilayer polymeric reflector has a transmission haze value of less than 50% in a visible wavelength region.

2. The multilayer polymeric reflector according to claim 1 wherein the amount of PVDF in the PMMA/PVDF blend is greater than 45%.

3. The multilayer polymeric reflector according to claim 1 wherein the amount of PVDF in the PMMA/PVDF blend is greater than or equal to about 50%.

4. The multilayer polymeric reflector according to claim 1, wherein the multilayer polymeric reflector resists shrinkage in use, to an extent that it demonstrates shrinkage of less than 1.5% in a total of width plus length following an exposure of 15 minutes to a temperature of 120 degrees centigrade.

5. The multilayer polymeric reflector according to claim 1, wherein the multilayer polymeric reflector has a transmission haze value of less than 30% in a visible wavelength region.

6. The multilayer polymeric reflector according to claim 1, wherein the multilayer polymeric reflector is annealed at an annealing temperature of between 70 and 95 degrees centigrade for at least 30 seconds.

7. The multilayer polymeric reflector according to claim 1, wherein the multilayer polymeric reflector is annealed at an annealing temperature of between 80 and 95 degrees centigrade for at least 30 seconds.

8. The multilayer polymeric reflector according to claim 1, wherein the multilayer polymeric reflector is annealed at an annealing temperature of between 70 and 95 degrees centigrade for at least two minutes.

9. The multilayer polymeric reflector according to claim 1, wherein the multilayer polymeric reflector is annealed at an annealing temperature of between 70 and 95 degrees centigrade for at least one hour.

10. The multilayer polymeric reflector according to claim 1, wherein the multilayer polymeric reflector has a reflectivity of greater than 97.8%.

11. An article comprising:
    a) a light source; and
    b) the multilayer polymeric reflector according to claim 1 situated so as to reflect light emitted by the light source.

12. An article comprising the multilayer polymeric reflector according to claim 1 situated so as to receive and reflect sunlight.

13. The article according to claim 11, wherein the reflector is at least 50% specular at visible wavelengths.

14. The article according to claim 11 wherein the reflector is at least 50% specular at visible wavelengths and no more than 90% specular at visible wavelengths.

15. The article according to claim 11 wherein the reflector is at least 50% specular at visible wavelengths and no more than 80% specular at visible wavelengths.

16. The article according to claim 12, wherein the reflector is at least 50% specular at visible wavelengths.

17. The article according to claim 12, wherein the reflector is at least 50% specular at visible wavelengths and no more than 90% specular at visible wavelengths.

18. The article according to claim 12, wherein the reflector is at least 50% specular at visible wavelengths and no more than 80% specular at visible wavelengths.

* * * * *